US009143266B2

(12) United States Patent
Mower et al.

(10) Patent No.: US 9,143,266 B2
(45) Date of Patent: Sep. 22, 2015

(54) CHIP INTEGRATED SINGLE PHOTON GENERATION BY ACTIVE TIME MULTIPLEXING

(71) Applicant: The Trustees of Columbia University in the City of New York, New York, NY (US)

(72) Inventors: Jacob Mower, New York, NY (US); Dirk R. Englund, New York, NY (US)

(73) Assignee: THE TRUSTEES OF COLUMBIA UNIVERSITY ON THE CITY OF NEW YORK, New York, NY (US)

( * ) Notice: Subject to any disclaimer, the term of this patent is extended or adjusted under 35 U.S.C. 154(b) by 0 days.

(21) Appl. No.: 14/149,531

(22) Filed: Jan. 7, 2014

(65) Prior Publication Data

US 2014/0153926 A1  Jun. 5, 2014

Related U.S. Application Data

(63) Continuation of application No. PCT/US2012/046385, filed on Jul. 12, 2012.

(60) Provisional application No. 61/507,904, filed on Jul. 14, 2011.

(51) Int. Cl.
*H04J 14/08* (2006.01)
*H04B 10/70* (2013.01)

(52) U.S. Cl.
CPC ............... *H04J 14/08* (2013.01); *H04B 10/70* (2013.01)

(58) Field of Classification Search
USPC ............. 359/326–332; 380/256, 278; 398/98, 398/101, 212
See application file for complete search history.

(56) References Cited

U.S. PATENT DOCUMENTS

| 5,745,613 A | 4/1998 | Fukuchi et al. |
| 5,825,949 A | 10/1998 | Choy et al. |
| 6,718,093 B2 | 4/2004 | Zhou |
| 7,162,124 B1 | 1/2007 | Gunn, III et al. |
| 7,253,871 B2 | 8/2007 | Lukishova et al. |
| 7,303,339 B2 | 12/2007 | Zhou et al. |
| 7,346,166 B2 | 3/2008 | Inoue et al. |
| 7,359,514 B2 | 4/2008 | Trifonov et al. |
| 7,570,365 B2 | 8/2009 | Trifonov et al. |
| 7,634,710 B2 | 12/2009 | Dabiri et al. |

(Continued)

FOREIGN PATENT DOCUMENTS

WO    WO 2004/073228    8/2004

OTHER PUBLICATIONS

U.S. Appl. No. 14/252,110, filed Apr. 14, 2014.

(Continued)

*Primary Examiner* — Daniel Petkovsek
(74) *Attorney, Agent, or Firm* — Baker Botts L.L.P.

(57) ABSTRACT

Techniques for converting signal and idler photons generated by a nonlinear optical system into a deterministic stream of single photons including receiving a heralded, nondeterministic source of signal and idler photons from the nonlinear optical process, separating one or more received signal photons from one or more received temporally corresponding idler photons, determining whether at least one of the one or more signal photons should be variably delayed, and if so, determining a delay length, and variably delaying the emission of one of the one or more signal photons, if any, by the determined delay length.

23 Claims, 4 Drawing Sheets

(56) References Cited

U.S. PATENT DOCUMENTS

| | | | |
|---|---|---|---|
| 7,831,048 | B2 | 11/2010 | Kastella et al. |
| 7,877,012 | B2 * | 1/2011 | Shapiro et al. ............... 398/57 |
| 2002/0110328 | A1 | 8/2002 | Bischel et al. |
| 2003/0169880 | A1 | 9/2003 | Nambu et al. |
| 2004/0264905 | A1 | 12/2004 | Blauvelt et al. |
| 2007/0076871 | A1 | 4/2007 | Renes |
| 2007/0093702 | A1 | 4/2007 | Yu et al. |
| 2008/0037998 | A1 | 2/2008 | Zhengfu et al. |
| 2008/0050126 | A1 | 2/2008 | Shapiro et al. |
| 2009/0175450 | A1 | 7/2009 | Brandt |
| 2009/0180776 | A1 | 7/2009 | Brodsky et al. |
| 2009/0304326 | A1 | 12/2009 | Blauvelt et al. |
| 2010/0079833 | A1 | 4/2010 | Langford et al. |
| 2011/0002578 | A1 | 1/2011 | Nakada et al. |
| 2011/0013266 | A1 | 1/2011 | Preble et al. |
| 2012/0077680 | A1 | 3/2012 | Berggren et al. |
| 2012/0146646 | A1 | 6/2012 | Manipatruni et al. |

OTHER PUBLICATIONS

U.S. Appl. No. 14/338,034, filed Jul. 22, 2014.

International Search Report and Written Opinion for PCT/US12/046385, dated Sep. 18, 2012.

International Search Report and Written Opinion for PCT/US12/060565, dated Jun. 25, 2013.

International Search Report and Written Opinion for PCT/US12/021923, dated Apr. 5, 2013.

International Search Report and Written Opinion for PCT/US13/059621, dated May 27, 2014.

Ali-Khan et al., "Large-Alphabet Quantum Key Distribution Using Energy-Time Entangled Bipartite States", Physical Review Letters, 98:060503 (4 pages) (2007).

Dauler et al., "Multi-Element Superconducting Nanowire Single-Photon Detector", IEEE Transaction on applied Superconductivity, 17(2):279-284 (2007).

Herder, "Designing and Implementing a Readout Strategy for Superconducting Single Photon Detectors", Massachusetts Institute of Technology, 112 pages (2010).

Levine et al., "Heralded, Pure-State single-Photon Source Based on a Potassium Titanyl Phosphate Waveguide", Optic Express, 18(4):3708-3718 (2010).

Mower et al., "Dense Wavelength Division Multiplexed Quantum Key Distribution Using Entangled Photons", Cornell University Library, (9 pages) (2011).

Ortlepp et al., "Demonstration of Digital Readout Circuit for Superconducting Nanowire Single Photon Detector", Otics Express, 19(19):18593-18601 (2011).

Roelkens et al., "Grating-Based Optical Fiber Interfaces for Silicon-on-Insulator Photonic Integrated Circuits", IEEE Journal of Selected Topics in Quantum Electronics, 17(3):571-580 (2011).

Sun et al., "Cantilever Couplers for Intra-Chip Coupling to Silicon Photonic Integrated Circuits", Optics Express, 17(6):4564-4574 (2009).

Xiong et al., "Slow-Light Enhanced Correlated Photon-Pair Generation in Silicon", Cornell University Library, p. 3413 (3 pages) (submitted Jun. 17, 2011).

* cited by examiner

CHIP INTEGRATED SINGLE PHOTON GENERATION BY ACTIVE TIME MULTIPLEXING

CROSS-REFERENCE TO RELATED APPLICATIONS

This application is a continuation of International Application No. PCT/US2012/046385 filed Jul. 12, 2012, which is related to U.S. Provisional Application Ser. No. 61/507,904, filed Jul. 14, 2011, which is incorporated herein by reference in its entirety and from which priority is claimed.

STATEMENT OF FEDERALLY SPONSORED RESEARCH OR DEVELOPMENT

This invention was made with government support under grant No. W911NF-10-1-0416, awarded by DARPA. The government has certain rights in the invention.

BACKGROUND

The disclosed subject matter relates generally to techniques for converting signal and idler photons generated by a nonlinear optics into a deterministic stream of single photons.

Single-photon sources are utilized in a number applications, including quantum information science, quantum computing/simulation, quantum cryptography/quantum key distribution, quantum teleportation, precision measurements and sensing, tests of quantum nonlocality, and high resolution lithography. For example, complex nonclassical optical states required for quantum metrology can be constructed from single-photon sources. Additionally, nondeterministic logic operations between multiple photonic qubits, combined with the ability to detect when gates have succeeded (feed-forwardability), can allow for efficient quantum computation.

To realize these and other quantum information technologies, efficient sources of indistinguishable single photons are useful. Certain techniques for generation of indistinguishable single photons include the application of quantum dots in micro- and nano-cavities, isolated cold atoms, and isolated single molecules in solid-state systems. However, they can require complex setups, including high vacuum and cryogenic temperatures, not immediately suitable for scalability.

While spontaneous parametric down conversion can produce highly indistinguishable single photons, generation is nondeterministic. Techniques for the generation of on-demand single photons using spontaneous parametric down conversion can be large and expensive, employing bulk optics. Moreover, such techniques can employ photon capture schemes that suffer from high loss, particularly when scaled up.

Accordingly, there is a need for an improved technique to provide sources of indistinguishable, on-demand single photons.

SUMMARY

In one aspect of the disclosed subject matter, a system including a photonic integrated circuit for converting signal and idler photons generated by nonlinear optics into a deterministic stream of single photons is provided. An exemplary system includes an optical element for receiving a heralded, nondeterministic source of signal and idler photons from the nonlinear optics. The system can include a separating element, adapted to intercept the emission path from the optical element, for separating one or more signal photons from one or more temporally corresponding idler photons.

In certain embodiments, the system can include a variable delay circuit which is optically coupled to the separating element, adapted to receive the one or more signal photons, and configured to delay the emission of at least one of the one or more signal photons using a variable optical buffer. It can also include a heralding decision control to receive the one or more idler photons and determine whether at least one of the one or more signal photons should enter the variable delay circuit, and if so, a delay length of the variable optical buffer.

In one embodiment, the nonlinear optics can include a type-II spontaneous parametric down conversion element to generate signal and idler photons. The spontaneous down conversion element can include a pump light source that generates pump light, a set of beam splitters and delay arms for splitting the pump light into a series of delays, thus generating a pulse train, and a non-linear crystal arranged to receive the pulse train and generate the signal and idler photons. In one embodiment, the non-linear crystal can be implemented on the photonic integrated chip. Alternatively, the nonlinear optics can include a four-wave mixing element to generate signal and idler photons. The four-wave mixing element can be implemented onto the photonic integrated chip.

In one embodiment, the variable optical buffer can include at least one optical delay line. For example, the variable buffer can include a plurality of static delays of predetermined lengths and a plurality of 2×2 switches, each switch coupled to a static display and in communication with the heralding decision control. The plurality of switches can be modulated by the heralding decision control. Alternatively, the variable optical buffer can include an optical resonator.

In one embodiment, the heralding decision control can be configured to detect a time of arrival associated with the at least one idler photon and the plurality of switches can be modulated according to the time of arrival. The heralding decision control can include at least one single photon detector for detecting the at least one idler photon, a data processor to receive a bit stream corresponding to a detection event from the single photon detector, and a bit generator to receive a processed bit stream from the processor and modulate a decision switch, thereby selecting whether the signal photon will enter the variable delay circuit.

In one embodiment, the system can include a clock set to a predetermined period and coupled to an element of the nonlinear process, the heralding decision control, and the variable control circuit. The predetermined lengths of the variable delay circuit can be multiples of the predetermined period.

In one embodiment, the heralding decision control can repeatedly detect a plurality of times of detection associated with a plurality of idler photons. The plurality of switches can be modulated according to the time of arrival, thereby emitting a plurality of single photons at a multiple of the predetermined period. That is, the heralding decision control can be configured to emit a deterministic, periodic stream of single photons. Alternatively, the heralding decision control can be configured to emit a non-periodic stream of single photons.

In another aspect of the disclosed subject matter, a method for converting signal and idler photons generated by a nonlinear optical process into a deterministic stream of single photons is provided. One example method includes receiving a heralded, nondeterministic source of signal and idler photons from the nonlinear optical process. One or more signal photons are separated from one or more temporally corresponding idler photons received by the optical element with a separating element placed in an emission path from the optical element. A determination is made as to whether at least one of the signal photons should be variably delayed, and if so, the delay length is determined. A variable delay circuit receives the one or more signal photons from the separating element, and delays, by the determined delay length, if any, the emission of at least one of the one or more signal photons with a variable optical buffer.

Figure 1:
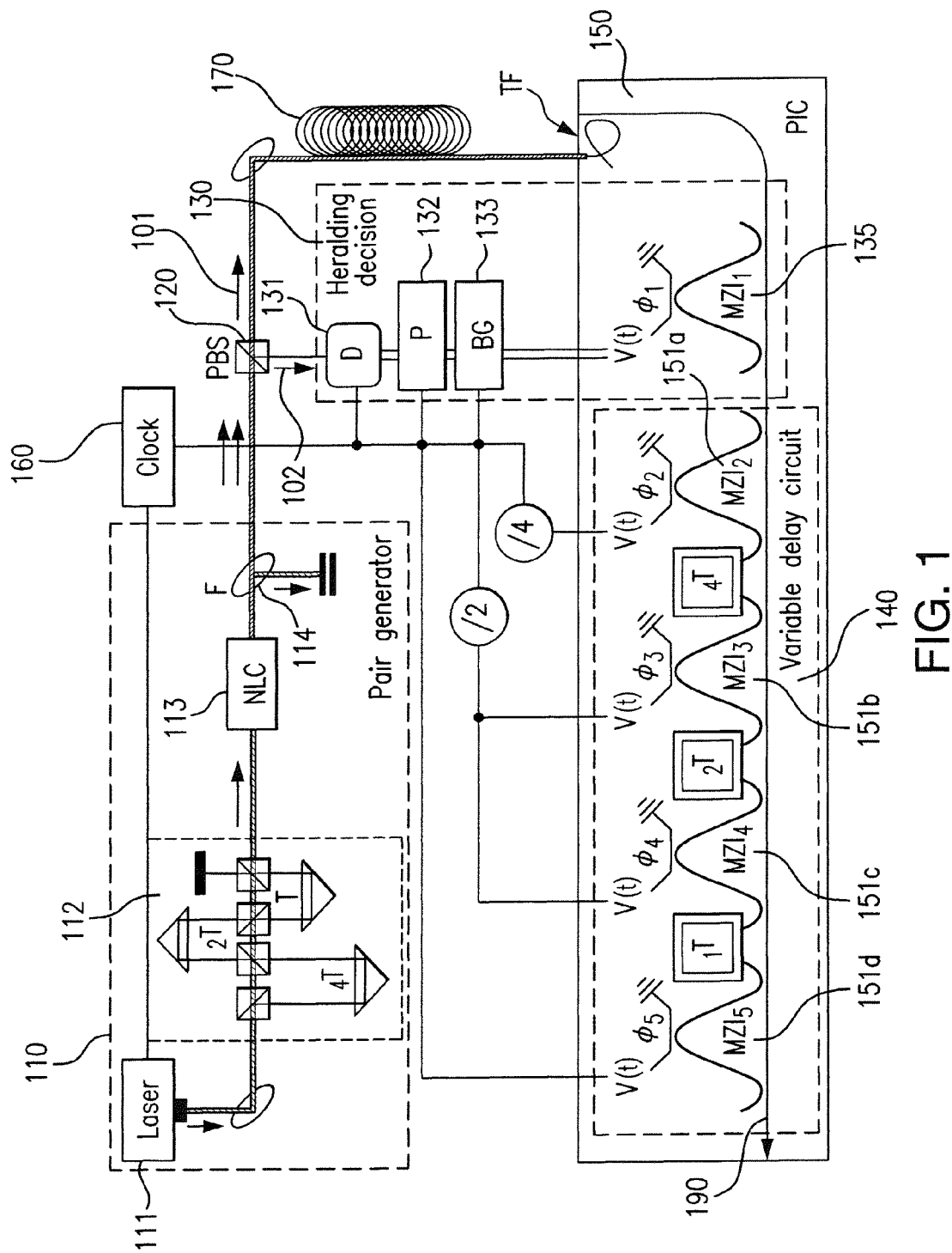
FIG. 1 is a schematic diagram of a system for converting signal and idler photons generated by a nonlinear optical system into a deterministic stream of single photons in accordance with an embodiment of the disclosed subject matter.

Throughout the drawings, the same reference numerals and characters, unless otherwise stated, are used to denote like features, elements, components or portions of the illustrated embodiments. Moreover, while the disclosed subject matter will now be described in detail with reference to the Figs., it is done so in connection with the illustrative embodiments.

DETAILED DESCRIPTION

Techniques for converting signal and idler photons generated by a nonlinear optical system into a deterministic stream of single photons are disclosed herein.

Spontaneous parametric down conversion and similar techniques can provide highly indistinguishable photon pairs, one photon of each pair referred to as a signal photon and the other photon of each pair referred to as an idler photon. Detection of one photon in the pair can herald the existence of the second. However, such techniques generate these photon pairs in a nondeterministic manner—that is, generation is stochastic. Certain techniques disclosed herein provide for multiplexing signal photons generated by spontaneous parametric down conversion (or a similar technique, such as four-wave mixing), to provide a deterministic source of single photons. Techniques disclosed herein can be accomplished by elements integrated onto a single photonic integrated chip, and can provide for high scalability with low loss.

In one aspect of the disclosed subject matter, a system including a photonic integrated circuit for converting signal and idler photons generated by a nonlinear optical system into a deterministic stream of single photons is provided. In another aspect of the disclosed subject matter, a method for converting signal and idler photons generated by a nonlinear optical process into a deterministic stream of single photons is provided.

Particular embodiments of the method and system are described below, with reference to FIG. 1 and FIG. 2, for purposes of illustration, and not limitation. For purposes of clarity, the method and the system are described concurrently and in conjunction with each other.

Figure 2:
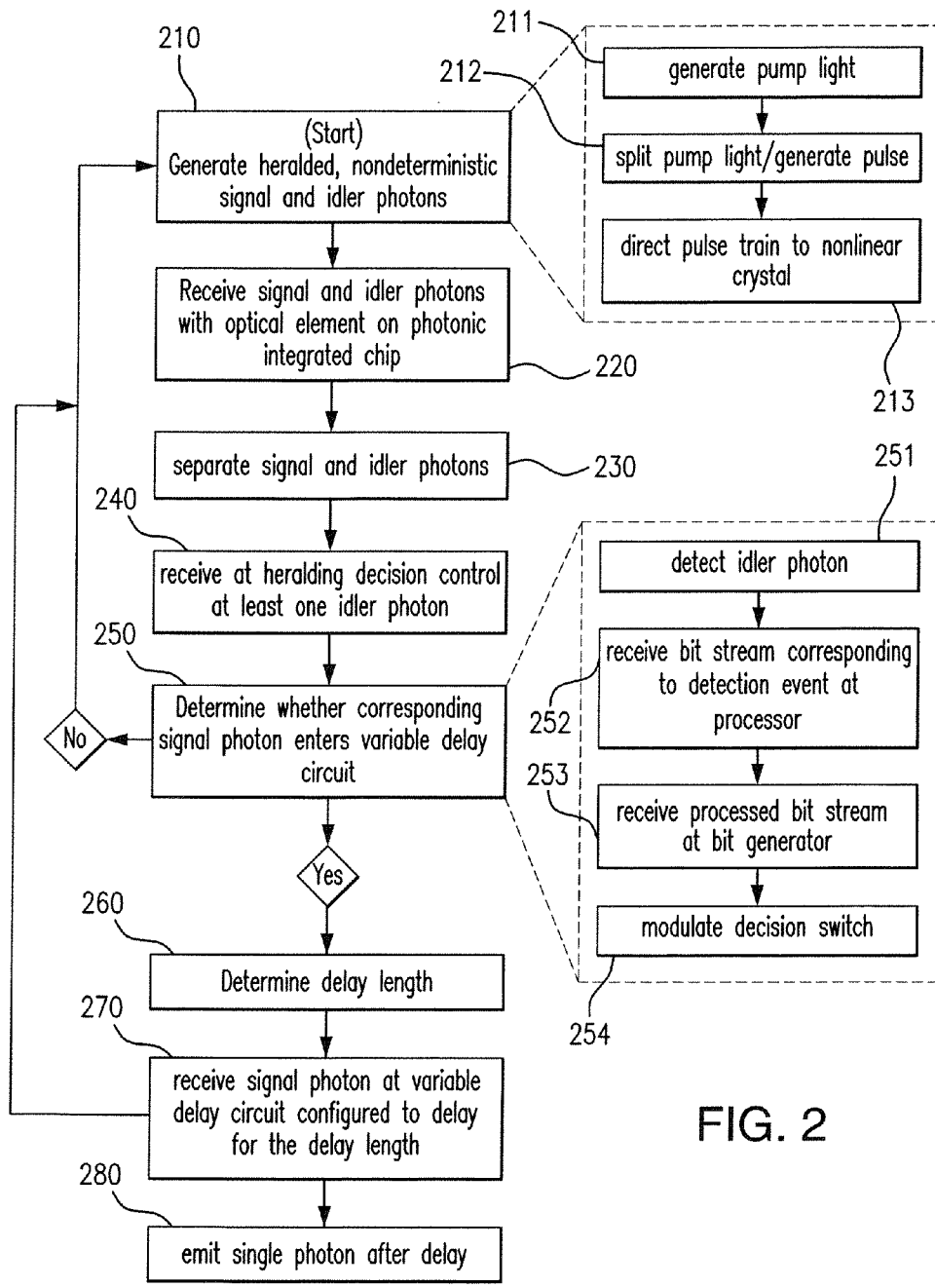
FIG. 2 is a flow diagram of a method for converting signal and idler photons generated by a nonlinear optical system into a deterministic stream of single photons in accordance with an embodiment of the disclosed subject matter.

In one embodiment, and with reference to FIG. 1 and FIG. 2, an optical element receives (220) heralded, nondeterministic signal 101 and idler 102 photons from a nonlinear optical system 110. The signal 101 and idler 102 photons can be time-energy entangled, and/or position-momentum entangled, however this need not be the case. In certain embodiments, the signal and idler photons need not be entangled. Additionally or alternatively, if the signal and idler photons generated by the nonlinear optical process can be deterministically separated, then the signal and idler photon need not be indistinguishable. For example, if the signal and idler photons have orthogonal polarization, they can be separated by a polarizing beam splitter with high selectivity; if the signal and idler photons have different frequencies, they can be separated with a frequency filter with high selectivity. While the signal 101 and idler 102 photons need not be indistinguishable, the signal photons 101 entering the variable delay circuit can be substantially indistinguishable. That is, for example, a signal photon 101 of a first photon pair can be substantially indistinguishable from a signal photon 101 of a second photon pair.

The nonlinear optical system 110 can be any system or process that can generate heralded signal 101 and idler 102 photons. For example, the nonlinear optical system 110 can include a spontaneous parametric down conversion (SPDC) element, such as a type-II SPDC element, to generate entangled signal 101 and idler photons. As used herein, the term "nonlinear optical system" and "nonlinear optics" can be used interchangeably. The term "nonlinear optics" can include, for example, a light source, beam splitters, delay arms, a nonlinear crystal, waveguides, or other elements associated with a nonlinear optical system or process.

SPDC is a second-order nonlinear optical process characterized by the interaction Hamiltonian, $\hat{H}_{int}=i\chi h(a_s^\dagger a_i^\dagger - a_s a_i)$, where $a_s$ ($a_i$) is the annihilation operator corresponding to the signal (idler) photon, and $\chi = E\chi^{(2)}$, where $\chi^{(2)}$ is the second order nonlinear susceptibility tensor and E is a classical pump field. The time-evolved state of the signal and idler photons can be given by $$|\psi(t)\rangle = e^{-i\hat{H}t/\hbar}|0,0\rangle = e^{-\chi^t(a_s^\dagger a_i^\dagger - a_s a_i)}|0,0\rangle \quad (1)$$

The time evolved state can be expanded in the Fock basis to calculate the probability of generating n pairs of signal and idler photons over some time t, $P_n = |\langle n,n|\psi(t)\rangle|^2 \approx (n+1)(\lambda/2)^n e^{-\lambda}$, where n (m) represents photons in the signal (idler) rail and $\lambda = 2 \tan h^2 \chi t$. Therefore, as $\lambda \to 0, |\psi(t)\rangle \to |0,0\rangle + \lambda|1,1\rangle$, which is a single-pair state. Detecting the idler photon of each pair can indicate the existence of the signal photon, which can yield highly indistinguishable heralded single photons.

In an embodiment where the nonlinear optical system 110 generates signal 101 and idler 102 photons by spontaneous parametric down conversion, the nonlinear optical system 110 can include, for example, a pump light source 111 that generates (211) pump light, a set of beam splitters and delay arms 112 for splitting (212) the pump light into a series of delays, thereby generating a pulse train, and a nonlinear crystal 113 arranged to receive the pulse train and generate the entangled signal 101 and idler 102 photons.

The pump light source 111 can be, for example, a laser. The laser can be configured to generate pump light, for example at 780 nm. The pump light can then be split by the set of beam splitters and delay arms 112 into a series of delays. For example, in one embodiment, the delay lengths can be 4T, 2T, and T, where T corresponds to a desired pump period. For such a configuration, an eight-pulse train can be generated. The pulse train can be directed to the nonlinear crystal 113. When photons in the pulse train are absorbed by the nonlinear crystal 113, there is a probability that a signal and corresponding idler photon will be emitted. In this process, energy and momentum are conserved, so that the signal and idler photons will have energies and momentums that sum to the energy and momentum of the pump photon that was absorbed. In certain embodiments, the signal and idler photons can have a wavelength of approximately 1560 nm.

In one embodiment, at least the nonlinear crystal 113 can be integrated with the photonic integrated chip. For example, a four-wave mixing element (e.g., a Si wire waveguide) can be fabricated on a silicon on insulator (SOI) wafer with a Si top layer on $SiO_2$ under-cladding using, for example, electron beam patterning and electron cyclotron resonance plasma etching. Additionally, the pump light source 111 and the series of beam splitters and delay arms 113 can also be integrated on the chip. For example, the series of beam splitter and delay arms 113 can be fabricated using an etching technique. Coupling regions from these structures to standard channel waveguides can be fabricated using a two-step etch, allowing for low loss delays and high-confinement structures on a single chip. Laser sources can be integrated on chip using, for example, a VCSEL geometry.

The nonlinear optical system 110 can alternatively include a four-wave mixing element to generate entangled signal and idler photons. Four-wave mixing is a third order nonlinear optical process whereby two pump photons can combine to generate two daughter photons. As with SPDC, energy and momentum are conserved in this process. In one embodiment, four wave mixing can be accomplished in straight silicon waveguides. Alternatively, optical resonators can reduce the amount of pump power needed and spectrally filter the daughter photons. The optical resonator can be, for example, a silicon ring waveguide resonator evanescently coupled to a bus waveguide. Alternatively, the resonator can be realized by coupled resonator optical waveguide structures.

The optical element 310 that receives (220) the signal 101 and idler 102 photons can be integrated onto the photonic integrated chip 150. The optical element 310 can be, for example, a polymer waveguide, to which an optical fiber can evanescently couple. This coupling geometry can offer low-loss transmission of the signal 101 and idler 102 photons on the photonic integrated chip.

In one embodiment, the separating element 120 separates (230) the signal and idler photons received by the optical element. The separating element 120 can be arranged to receive the signal 101 and idler 102 photons. The separating element 120 can be, for example, a polarizing beam splitter, a spectral filter, or a spatial filter. For example, when the signal 101 and idler 102 photons are generated by a type-II spontaneous parametric down conversion element, the signal 101 and idler 102 photons can be split based on their polarization, so the separating element 120 can be a polarizing beam splitter. The signal 101 photon can, for example, pass through the polarizing beam splitter while the idler 102 photon can be reflected off of the beam splitter. One of ordinary skill in the art will recognize that other properties of the signal 101 and idler 102 photons can be used for separation, and can depend on the method or system used in their generation. In one embodiment, the separating element can be integrated onto the photonic integrated chip 150.

In one embodiment, the system includes a variable delay circuit 140 which is optically coupled to the separating element 120, adapted to receive (270) the one or more signal 101 photons therefrom, and configured to delay the emission of at least one of the one or more signal photons by a variable optical buffer. For example, the variable delay circuit 140 can include an optical resonator that can be configured for variable delay. Alternatively, the variable delay circuit 140 can include at least one optical delay line 151. As used herein, the term "variable delay circuit" can include various element, for example an optical router and a "variable optical buffer." As used here, the term "variable optical buffer" can include, for example, one or more optical resonators or one or more variable delay lines. The variable delay circuit 140 can be coupled to the separating element 120, for example, with a waveguide and/or optical fiber.

In an exemplary embodiment, the variable delay circuit 140 can include a plurality of static delays 151 of predetermined lengths. Each static delay 151 can be coupled with a 2×2 optical switch, for example with a waveguide. Each switch can be modulated by the heralding decision control 130, such that a decision can be made to route a photon into an associated static delay 151 based on the modulation of the switch. The delays can have delay lengths corresponding to exponentially increasing multiples of a clock 160 period. A first delay 151b can have a delay length, of, for example, 4T, where T is the period of the clock 160. T can also be the period of the pulse-train generated by the pump light source 111. A second delay 151c can have a delay length of 2T and a third delay 151d can have a delay length of T. Thus based on which switches are activated, the signal 101 photon can be routed through a combination of delays 151 to achieve a desired total delay length. With three static delay circuits of periods 4T, 2T, and T, a total of eight different delays can be achieved. Table 1 illustrates the phases of the plurality of switches required to achieve delays of 0 to 7T. Because the values are periodic, the modulators can be driven solely by a clock signal.

TABLE 1

| Bin | Delay | $\phi_2$ | $\phi_3$ | $\phi_4$ | $\phi_5$ |
|---|---|---|---|---|---|
| 1 | 7T | π | 0 | 0 | π |
| 2 | 6T | π | 0 | π | 0 |
| 3 | 5T | π | π | π | π |
| 4 | 4T | π | π | 0 | 0 |
| 5 | 3T | 0 | 0 | 0 | π |
| 6 | 2T | 0 | 0 | π | 0 |
| 7 | T | 0 | π | π | π |
| 8 | 0 | 0 | π | 0 | 0 |

The static delay lines can be integrated onto the photonic integrated chip 150. After the signal photon passes through the variable delay circuit, it can be emitted (280).

Determination of whether a signal photon will enter the variable delay circuit, and if so for what length of delay, can be accomplished with the heralding decision control 130. In one embodiment, the heralding decision control 130 receives (240) an idler photon 102 (which necessarily corresponds with a temporally identical signal 101 photon) from the separating element and determines (250) whether the corresponding signal photon 101 should enter the variable delay circuit 140, and if so, determines (160) a delay length of the variable optical buffer. The heralding decision control 150 can detect the time at which an idler 102 photon is detected and modulate the switches associated with the variable delay circuit based on this time of arrival.

Determining (250) whether a corresponding signal 101 photon should enter the variable delay circuit can include detecting the idler 102 photon with a photon detector 131. The photon detector can be, for example, a single photon detector. When an idler 102 photon is detected (251), the photon detector 131 can communicate detection information, including the time of arrival, to a data processor 132. The data processor 132 can be adapted to receive (252) a bit stream corresponding to the detection events from the photon detector 131. The data processor 132 can process the detection information and determine whether the signal 101 photon should enter the variable delay circuit. The data processor 132 can also process the detection information and determine a time period the signal 101 photon should be delayed in the variable delay circuit 140.

In one embodiment, for example, if a signal photon has already entered the variable delay circuit, then within a predetermined amount of time (for example, within 7T, where T is the period of the driving clock), the data processor 132 can determine, based on a new detection event of an idler 102 photon within this period, that the corresponding signal 101 photon should not enter the variable delay circuit. Additionally or alternatively, the data processor 132 can determine that, based on a recorded time of arrival of an idler 102 photon, that the corresponding signal 101 photon should be delayed by a multiple of T (for example, 3T). The data processor 132 can then send (253) a processed bit stream to a bit generator 133 adapted to modulate (254) the switches of the variable delay circuit 140. The photon detector 131, processor 132, and bit generator 133, can be implemented on the photonic integrated chip.

In some embodiments, when the heralding decision control 130 determines that a signal 101 photon will enter the variable delay circuit 140, the signal photon can be routed via an optical router 170 to the variable delay circuit 140. A 2×2 switch 135 can be used to route the signal photon into the variable delay circuit 140. For example, if a decision is made by the processor 132 to route the signal photon into the variable delay circuit, the bit generator can modulate, at a rate of 1/T, the switch 135 to enable to signal photon to enter the variable delay circuit 140. The switch 135 can be, for example a Mach-Zehnder interferometer (MZI), which can be modulated, for example, through charge injection or temperature tuning.

In some embodiments, the switches in the variable delay circuit 140 can also be Mach-Zehnder interferometers, and can also be modulated by the bit generator 133. For example, the switch corresponding to the static delay 151d with a delay length of T can be modulated at a rate of 1/T by the bit generator 133. The switch corresponding to the static delay 151c with a delay length of 2T can be modulated at a rate of ½T and the switch corresponding to the static delay 151b with a delay of 4T can be modulated at a rate of ¼T. In this manner, no additional processing is required to modulate the switches of the variable delay circuit 140; simple periodic clock cycles can accomplish the modulation.

Figure 4:
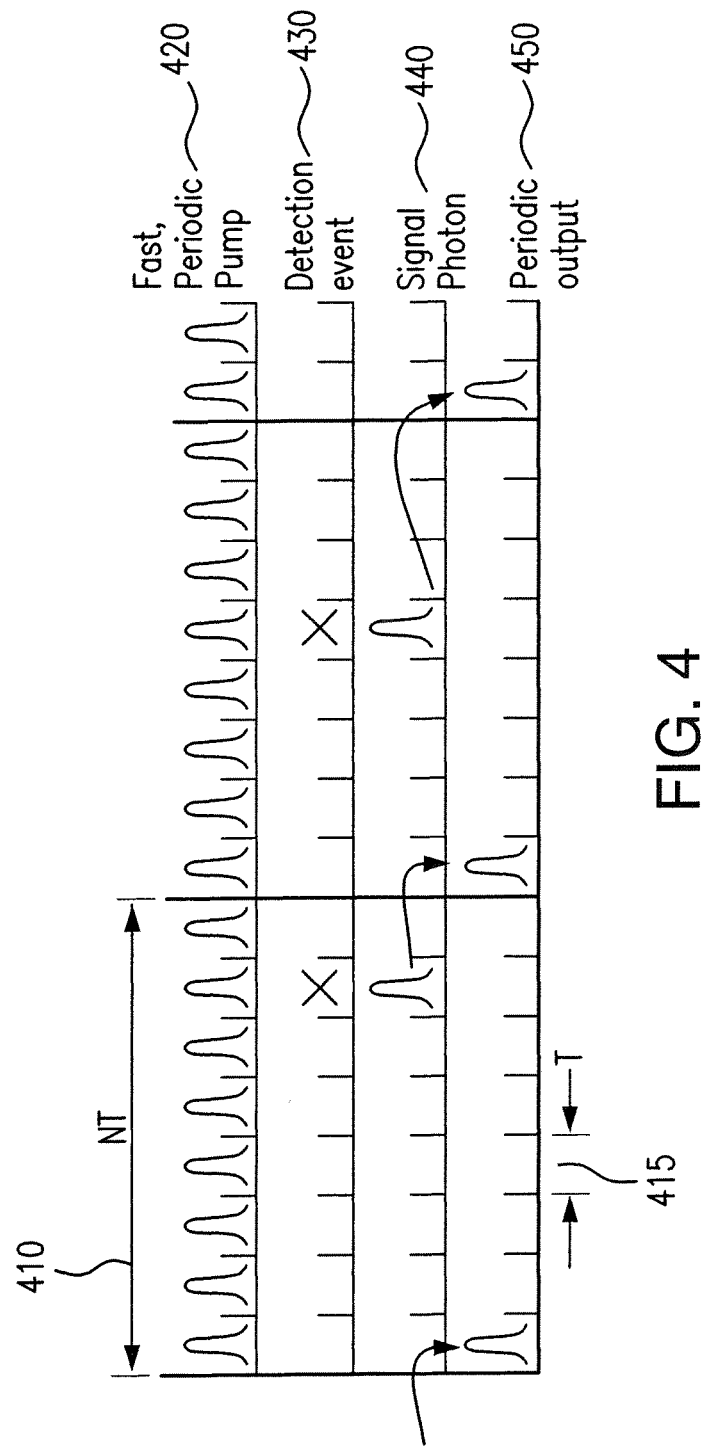
FIG. 4 is a representation of actively multiplexed parametric photon generation according an embodiment of the disclosed subject matter.

In an exemplary embodiment, an eight-pulse train can correspond to N=8 "time bins." For example, and with reference to FIG. 4, an eight-pulse train can pump the nonlinear crystal 113 such that there is a probability that a signal and idler photon will be emitted for each pulse in the train. That is, each time bin 415 in a series 410 of 8 time bins can correspond to each pulse in the pulse train. The nonlinear crystal 113 can be pumped continuously with sets of eight-pulse trains 420. Photon pairs will be spontaneously generated at a random time. The idler photon can then be detected 430. Detection of the idler photon heralds the existence of a corresponding signal photon 440. This signal photon can then be delayed to a desired emission time. For example, the desired emission time can correspond to every 8th "time bin." That is, if a detection event occurs in the first time bin, the corresponding signal photon can be delayed for a period of 7T. Likewise, if a detection event occurs in the second time bin, the corresponding signal photon can be delayed for a period of 6T, and so on. Such a configuration can enable periodic output 450.

Alternatively, the processor 132 can be configured to emit photons in a nonperiodic fashion.

The signal 101 and idler 102 photons can be guided on the photonic integrated chip 150 with the use of suitable waveguides and couplers. For example, in one embodiment, high-index contrast silicon on insulator (SOI) waveguides can transport the photons from one element to the next. In some cases, SU-8 spot size converters can be employed for coupling large-area fiber modes to the SOI waveguides. Edge coupling loss can occur with a loss of approximately 2-3 dB/facet. In some embodiments, lower losses can be achieved by tapered-fiber coupling to the silicon waveguides. Additionally, intrinsic loss can be reduced to approximately 0.1 dB/cm in low confinement ridge structures. Coupling regions from these structures to standard channel waveguides can be fabricated using a two-step etch, allowing for low loss delays and high-confinement structures on a single chip. To further reduce loss, the period of the clock can be reduced.

In one embodiment, the switches of the variable delay circuit can be modulated at approximately 25 GHz. That is, the driving clock can have a period of 40 ps. The "time bins" can correspond to 40 ps increments. Loss can occur in the switches of the variable delay circuit due to free carrier absorption from two-photon absorption and mode conversion loss. By separating the waveguides in directional couplers, for example MZI directional couplers, by more than 150 nm, mode conversion loss can be below 0.1 dB. Additionally, loss in the switching element can be reduced by reverse-biased p-i-n modulators configured to sweep out free carriers on picoseconds time scales. In one embodiment, assuming a nonlinear refractive index, $n_2=6\times10^{-14}$ cm$^2$/W, and a reverse bias figure of merit of 0.2 cm$^{1/2}$ps$^{-1/2}$, a switching efficient of approximately $\eta=0.87$ can be achieved with 40 ps carrier lifetime.

Photon generation efficiency, $\eta$, can be defined as the probability that a single photon is emitted at a time interval NT. $\eta$ can depend on the efficiency with which signal photons are transmitted through the waveguide switches and delay lines, and the "heralding efficiency" with which the idler photon is detected for heralding. For a configuration with a small number of delays N, on chip loss of signal photons can be low because the chip contains only short delays and few switches. As N increases, while heralding efficiency can increase, the number of switches and delay lines increases as well, which can reduce $\eta$. In some embodiments, a balance between heralding efficiency and generation efficiency can be achieved.

In some embodiments, instead of using one photon detector to herald the existence of the signal photon, detector arrays can be used to detect all idler photons by switching the heralding channel into multiple detection channels. In this embodiment, the signal photon that was heralded last can be transmitted, thereby reducing the average delay line loss. Fast routing to the individual detectors can be done on chip.

Figure 3:
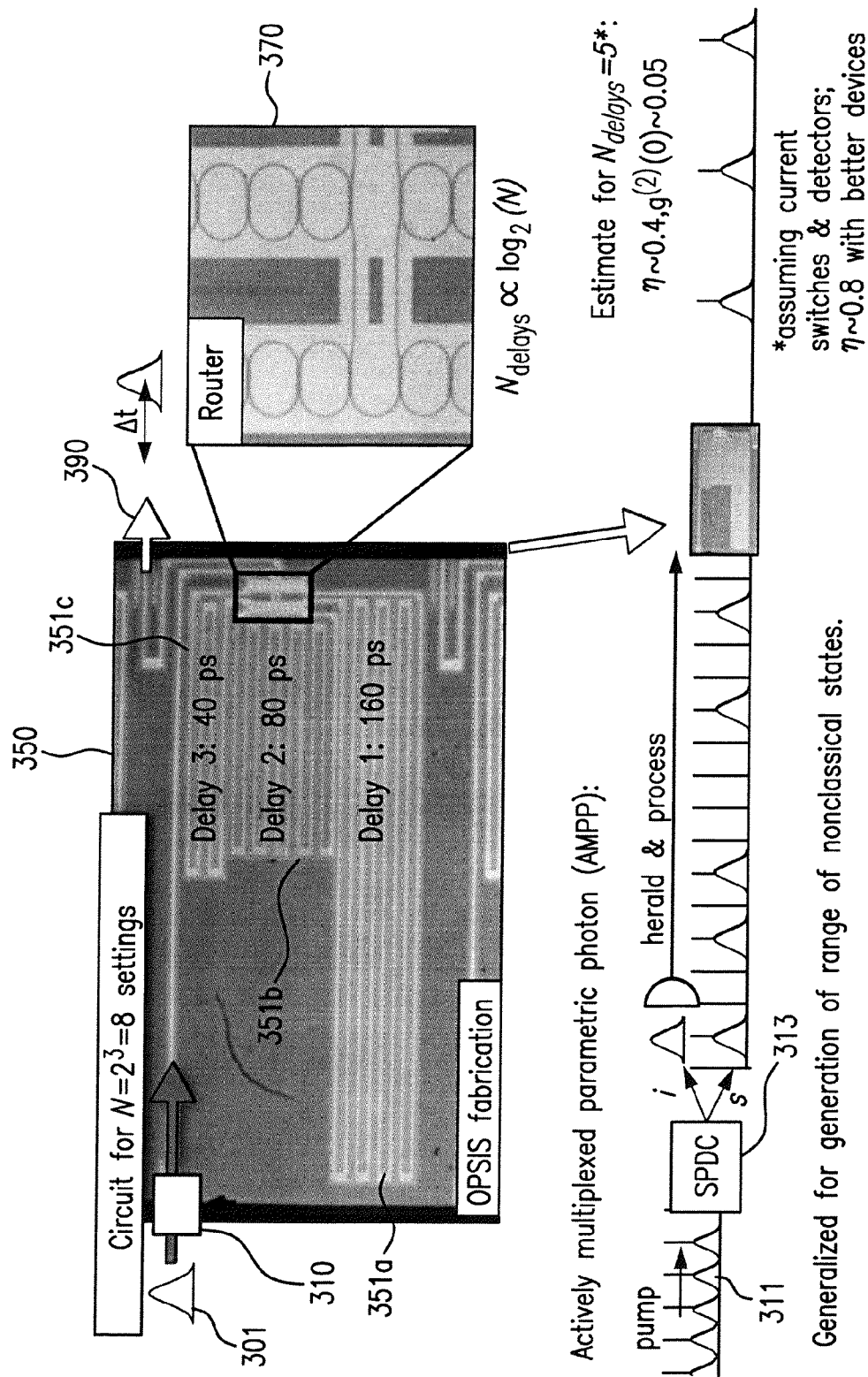
FIG. 3 is a depiction of a photonic integrated chip for converting signal and idler photons generated by a nonlinear optical system into a deterministic stream of single photons in accordance with an embodiment of the disclosed subject matter.

FIG. 3 is a depiction of a photonic integrated chip for converting entangled signal and idler photons generated by a nonlinear optical system into a deterministic stream of single photons in accordance with an exemplary embodiment of the disclosed subject matter. Pump light 311 can be directed to a nonlinear crystal 313 for spontaneous parametric down conversion generation of a signal and idler photon at random times. A photonic integrated chip 350 can be adapted to receive, with an optical element 310 the signal photon 301. The signal photon can be directed through waveguides to an optical router 370 which can include a number of switches modulated by the heralding decision control (not shown). In this embodiment, there are three static delays 351. A first delay has a delay 351c length of 40 ps, a second delay 351b has a delay length of 80 ps, and a third delay 351*a* has a delay length of 160 ps. These static delays 351 can achieve eight discrete total delay times corresponding to 40 ps increments. The signal photon can be routed through these delays, and be emitted from the photonic integrated chip 350 at location 390. In this embodiment, switching loss scales with the total number of delays in the variable delay circuit as $\log_2(N)$, where N is the number of delays.

The presently disclosed subject matter is not to be limited in scope by the specific embodiments herein. Indeed, various modifications of the disclosed subject matter in addition to those described herein will become apparent to those skilled in the art from the foregoing description and the accompanying figures. Such modifications are intended to fall within the scope of the appended claims.

The invention claimed is:

1. A system including a photonic integrated circuit for converting signal and idler photons generated by nonlinear optics into a deterministic stream of single photons, comprising:
   an optical element for receiving a heralded, nondeterministic source of signal and idler photons from the nonlinear optics;
   a separating element, adapted to intercept an emission path from the nonlinear optics, for separating one or more signal photons from one or more temporally corresponding idler photons received by the optical element;
   a variable delay circuit, optically coupled to the separating element, adapted to receive the one or more signal photons therefrom, and configured to delay the emission of at least one of the one or more signal photons by a variable optical buffer; and
   a heralding decision control, operatively coupled to the variable delay circuit, optically coupled to the separating element, adapted to receive the one or more idler photons therefrom, and configured to determine whether at least one of the one or more signal photons should enter the variable delay circuit, and if so, configured to determine a delay length of the variable optical buffer.

2. The system of claim 1, wherein the nonlinear optics further includes a type-II spontaneous parametric down conversion element to generate signal and idler photons.

3. The system of claim 2, wherein the spontaneous parametric down conversion element further includes:
   a pump light source that generates pump light;
   a set of beam splitters and delay arms for splitting the pump light into a series of delays, thereby generating a pulse train;
   a non-linear crystal arranged to receive the pulse train and generate the signal and idler photons.

4. The system of claim 3, wherein the non-linear crystal comprises a non-linear crystal integrated with the photonic integrated circuit.

5. The system of claim 1, wherein the nonlinear optics further includes a four-wave mixing element for generating the signal and idler photons.

6. The system of claim 5, wherein at least the four-wave mixing element is a four-wave mixing element integrated with the photonic integrated circuit.

7. The system of claim 1, wherein the separating element comprises an element selected from the group consisting of a polarizing beam splitter, a spectral filter, and a spatial filter.

8. The system of claim 1, wherein the variable optical buffer further includes at least one coupled optical resonator.

9. The system of claim 1, wherein the variable optical buffer further includes at least one optical delay line.

10. The system of claim 1, wherein the variable delay circuit further comprises:
    a plurality of static delays of predetermined lengths;
    a plurality of 2×2 switches, each switch coupled to a static delay, each switch leading in and out of each static delay and in communication with the heralding decision control, wherein the plurality of the switches can be modulated by the heralding decision control.

11. The system of claim 10, wherein the heralding decision control is further configured to detect a time of arrival associated with the at least one idler photon, and wherein the plurality of switches is modulated according to the time of arrival.

12. The system of claim 10, further comprising a clock set to a predetermined period, coupled to the nonlinear optics, the heralding decision control, and the variable control circuit, wherein the predetermined lengths are multiples of the predetermined period.

13. The system of claim 12, wherein the heralding decision control is configured to repeatedly detect a plurality of times of detection associated with a plurality of idler photons, and wherein the plurality of switches is modulated according to the time of arrival, thereby emitting a plurality of single photons at a multiple of the predetermined period.

14. The system of claim 1, wherein the heralding decision control further comprises:
    at least one single photon detector for detecting the at least one idler photon and generating a bit stream corresponding to such detection, if any;
    a data processor adapted to receive the bit stream from the single photon detector;
    a bit generator adapted to receive a processed bit stream from the processor and modulate a decision switch, thereby selecting whether the at least one signal photon will enter the variable delay circuit.

15. The system of claim 1, further comprising a clock set to a predetermined period, coupled to the nonlinear optics, the heralding decision control, and the variable control circuit.

16. A method for converting signal and idler photons generated by a nonlinear optical process into a deterministic stream of single photons, comprising:
    receiving a heralded, nondeterministic source of signal and idler photons from the nonlinear optical process;
    separating one or more received signal photons from one or more received temporally corresponding idler photons;
    determining whether at least one of the one or more signal photons should be variably delayed, and if so, determining a delay length; and
    variably delaying the emission of one of the one or more signal photons, if any, by the determined delay length using a variable optical buffer.

17. The method of claim 16, wherein the nonlinear optical process includes generating signal and idler photons with a type-II spontaneous parametric down conversion process.

18. The method of claim 17, wherein the spontaneous parametric down conversion process includes:
    generating a pump light;
    splitting the pump light into a series of delays, thereby generating a pulse train;
    directing the pulse train to a non-linear crystal arranged to receive the pulse train and generate the signal and idler photons.

19. The method of claim 18, wherein the deterministic stream of single photons comprises a periodic stream.

20. The method of claim 16, wherein the nonlinear optical process includes generating signal and idler photons using a four-wave mixing process.

21. The method of claim 16, wherein delaying the emission further comprises:
   optically routing the one or more signal photons through at least one of a plurality of static delays of predetermined lengths;
   electronically controlling a plurality of 2×2 switches, each switch coupled to a static delay, each switch leading in an out of each static delay and in communication with a heralding decision control, wherein the plurality of the switches can be modulated by the heralding decision control.

22. The method of claim 16, wherein determining whether at least one of the one or more signal photons should be variably delayed comprises:
   detecting the at least one idler photon;
   receiving a bit stream corresponding to a detection event;
   receiving, a processed bit stream; and
   selecting whether the at least one signal photon will be variably delayed.

23. The method of claim 16, wherein the deterministic stream of single photons comprises a non-periodic stream.

* * * * *